(12) United States Patent
Xin et al.

(10) Patent No.: US 9,870,239 B2
(45) Date of Patent: Jan. 16, 2018

(54) METHOD AND DEVICE FOR RUNNING APPLICATION PROGRAM

(71) Applicant: Xiaomi Inc., Beijing (CN)

(72) Inventors: Xianlong Xin, Beijing (CN); Yao He, Beijing (CN); Zhaohui Yu, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 0 days.

(21) Appl. No.: 14/693,872

(22) Filed: Apr. 23, 2015

(65) Prior Publication Data

US 2016/0077819 A1 Mar. 17, 2016

Related U.S. Application Data

(63) Continuation of application No. PCT/CN2015/071360, filed on Jan. 22, 2015.

(30) Foreign Application Priority Data

Sep. 16, 2014 (CN) .......................... 2014 1 0470307

(51) Int. Cl.
*G06F 9/445* (2006.01)
*G06F 9/455* (2006.01)

(52) U.S. Cl.
CPC ...... *G06F 9/45504* (2013.01); *G06F 9/44521* (2013.01); *G06F 9/44505* (2013.01); *G06F 9/45529* (2013.01)

(58) Field of Classification Search
None
See application file for complete search history.

(56) References Cited

U.S. PATENT DOCUMENTS

| 7,069,554 B1 * | 6/2006 | Stammers | G06F 9/445 709/220 |
|---|---|---|---|
| 8,646,059 B1 * | 2/2014 | von Behren | G06Q 20/367 719/311 |
| 2013/0145463 A1 * | 6/2013 | Ghosh | G06F 21/56 726/22 |

FOREIGN PATENT DOCUMENTS

| CN | 101593100 A | 12/2009 |
|---|---|---|
| CN | 102722392 A | 10/2012 |
| CN | 103150166 A | 6/2013 |
| CN | 104267977 A | 1/2015 |

(Continued)

OTHER PUBLICATIONS

Oracle: "Running JAR-Packaged Software (The Java (TM) Tutorials > Deployment > Packaging Programs in JAR Files)", Jul. 25, 2014 (Jul. 25, 2014), XP055243386.

(Continued)

*Primary Examiner* — Chuck Kendall
(74) *Attorney, Agent, or Firm* — Jun He Law Offices P.C.; James J. Zhu

(57) ABSTRACT

The present disclosure relates to a method and a device for running an application program. The method includes: receiving a triggering signal instructing to run a second application program in a operating first application program; loading and parsing an installation package of the second application program to obtain a program component of the second application program through the first application program; and running the program component of the second application program in a runtime environment provided by the first application program.

21 Claims, 6 Drawing Sheets

(56) References Cited

FOREIGN PATENT DOCUMENTS

JP            2012243262 A      12/2012
JP            2013137612 A       7/2013

OTHER PUBLICATIONS

Oracle: "Java Web Start—Frequently Asked Questions (FAQ)", Aug. 15, 2013 (Aug. 15, 2013), XP055243395.
Anonymous: "Run Windows for Mac with Virtualization: Try VMware Fusion Free | United States", Sep. 14, 2014 (Sep. 14, 2014), XP055242884.
Jim Tanous: "Parallels Desktop 10 Emphasizes Features Over Performance", Aug. 26, 2014 (Aug. 26, 2014), pp. 1-16, XP055242878.
Anonymous: "Press Release: RIM Expands Application Ecosystem for BlackBerry PlayBook—Android Apps on Playbook!!! | CrackBerry.com", Mar. 26, 2011 (Mar. 26, 2011), XP055243108.
Anonymous: "Executing a different Jar file from another Java program—Stack Overflow", Jan. 19, 2014 (Jan. 19, 2014), XP055243171.
Anonymous: "How to run (not only install) an android application using .apk file?—Stack Overflow", Oct. 13, 2013 (Oct. 13, 2013), XP055243110.
Anonymous: "apk—Install Application programmatically on Android—Stack Overflow", May 26, 2014 (May 26, 2014), XP055243181.
Anonymous: "Android—Start Another Activity "of Another Application" | HMKCode", Sep. 19, 2013 (Sep. 19, 2013), XP055243186.
Anonymous: "Application Fundamentals | Android Developers", Sep. 15, 2014 (Sep. 15, 2014), XP055243242.
Anonymous: "Intents and Intent Filters | Android Developers", Sep. 13, 2014 (Sep. 13, 2014), XP055243245.
Anonymous: "anddev.org—View topic—Install/run applications form within another application", Jan. 29, 2013 (Jan. 29, 2013), XP055243258.
International Search Report for PCT/CN2015/071360.
Extended European Search Report for 15185498.1.
European Search Report of EP15135493.1.
European Search Opinion of EP15185498.1.
Examination Report of EP15135498.1 dated Dec. 8, 2016.
Oracle, "Running JAR-Packaged Software (The Java(TM) TutorialsDeploymentPackaging Programs in JAR Files)", Jul. 25, 2014, Retrieved from the Internet: URL: https://web.archive.org/web/20140725014919/http://docs.orcle.com/javase/tutorial/deployment/jar/run.html.
Oracle, "Java Web Start—Frequently Asked Questions (FAQ)", Aug. 15, 2013, Retrieved from the Internet: URL: https://web.archive.org/web/20130815012059/http://docs.orcle.com/javase/7/docs/technotes/guides/javaws/developersguide/faq.html.
Anonymous, "Run Windows for Mac with Virtualization: Try VMware Fusion Free | United States", Sep. 14, 2014, Retrieved from the Internet: URL: https://web.archive.org/web/20140914004528/http://www.vmware.com/products/fusion/.
Jim Tanous: "Parallels Desktop 10 Emphasizes Features Over Performance", Aug. 26, 2014, pases 1-16, Retrieved from the Internet: URL: http://www.tekrevue.com/parallels-desktop-10-benchmarks-review/.
Anonymous, "Press Release: RIM Expands Application Ecosystem for BlackBerry Playbook—Android Playbook!!! | CrackBerry.com", Mar. 24, 2011, Retrieved from the Internet: URL: https://web.archive.org/web/20110326151752/http://crackberry.com/press-release-rim-expands-application-ecosystem-blackberry-playbook-android-apps-playbook.
Anonymous, "Executing a different Jar file from another java program—Stack Overflow", Jan. 19, 2014, Retrieved from the Internet: URL: https://web.archive.org/web/20140119122844/http://stackoverflow.com/questions/6599290/executing-a-different-jar-file-from-another-java-program.
Anonymous, "How to run (not only install) an android application using .apk file—Stack Overflow", Oct. 13, 2013, Retrieved from the Internet: URL: https://web.archive.org/web/20131013071604/http://stackoverflow.com/questions/6109234/how-to-run-not-only-instaii-an-android-application-using-apk-file.
Anonymous, "apk—Install Application programmatically on Android—Stack Overflow", May 26, 2014, Retrieved from the Internet: URL: https://web.archive.org/web/20140526065624/http://stackoverflow.com/questions/4604239/install-application-programmatically-on-android.
Anonymous, "Android—Start Another Activity "of Another Application" | HMKCode", Sep. 19, 2013, Retrieved from the Internet: URL: https://web.archive.org/web/20130919092620/http://hmkcode.com/android-start-another-activity-of-another-activity-of-another-application.
Anonymous, "Application fundamentals | Android Developers", Sep. 15, 2014, Retrieved from the Internet: URL: https://web.archive.org/web/20140915034445/http://developer.android.com/guide/components/fundamentals.html.
Anonymous, "Intents and Intent Filters | Android Developers", Sep. 13, 2014, Retrieved from the Internet: URL: https://web.archive.org/web/20140913085853/http://developer.android.com/guide/components/intents-filters.html.
Anonymous, "anddev.org—View topic—Install/run applications from within another application", Jan. 29, 2013, Retrieved from the Internet: URL: https://web.archive.org/web/20130129130835/http://www.anddev.org/other-coding-problems-f5/install-run-applications-from-within-another-application-t6909.html.
Gumasang, "Learning Essence, Android—Intent", Jun. 14, 2011, Retrieved from the Internet: URL: http://akj61300.blog.me/80132434258.
International Search Report of PCT/CN2015/071360.
Written Opinion of ISA of PCT/CN2015/071360.

* cited by examiner

METHOD AND DEVICE FOR RUNNING APPLICATION PROGRAM

CROSS-REFERENCE TO RELATED APPLICATIONS

This application is a Continuation Application of International Application No. PCT/CN2015/071360, filed on Jan. 22, 2015, which is based upon and claims priority to Chinese Patent Application 201410470307.8, filed on Sep. 16, 2014, the entire contents of which are incorporated herein by reference.

TECHNICAL FIELD

The present disclosure generally relates to the field of mobile terminals, and more particularly, to a method and a device for running an application program.

BACKGROUND

An Android operating system is an intelligent operating system, which may provide different functions by installing different application programs.

In the related art, a developed and completed application program is packed into an installation package in a format with an apk file extension, and the installation package is published to users. When the users wish to use the application program, the users may install the installation package in a mobile terminal with the Android operating system and then runs the application program. But for some users, such as the elderly, the installation of the application program is too difficult to grasp.

SUMMARY

The embodiments of the present disclosure provide a method and a device for running an application program.

According to a first aspect of embodiments of the present disclosure, there is provided a method for running an application program, including: receiving a triggering signal instructing to run a second application program in an operating first application program; loading and parsing an installation package of the second application program to obtain a program component of the second application program through the first application program; and running the program component of the second application program in a runtime environment provided by the first application program.

According to a second aspect of embodiments of the present disclosure, there is provided a device for running an application program, including: a processor; a memory configured to store an instruction executable by the processor; wherein the processor is configured to perform: receiving a triggering signal instructing to run a second application program in an operating first application program; loading and parsing an installation package of the second application program to obtain a program component of the second application program through the first application program; and running the program component of the second application program in a runtime environment provided by the first application program.

According to a third aspect of embodiments of the present disclosure, there is provided a non-transitory computer-readable storage medium having stored therein instructions that, when executed by a processor of a mobile terminal, causes the mobile terminal to perform a method for running an application program, the method including: receiving a triggering signal instructing to run a second application program in an operating first application program; loading and parsing an installation package of the second application program to obtain a program component of the second application program through the first application program; running the program component of the second application program in a runtime environment provided by the first application program.

By loading and parsing the installation package of the second application program in the operating first application program, the program component of the second application program is obtained, and the program component of the second application program is run in the runtime environment provided by the first application program. Thus, the problem that only when a corresponding installation package is installed, an application program can be used is solved. Accordingly, the second application program can be run in the runtime environment provided by the first application program without installing the second application program.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
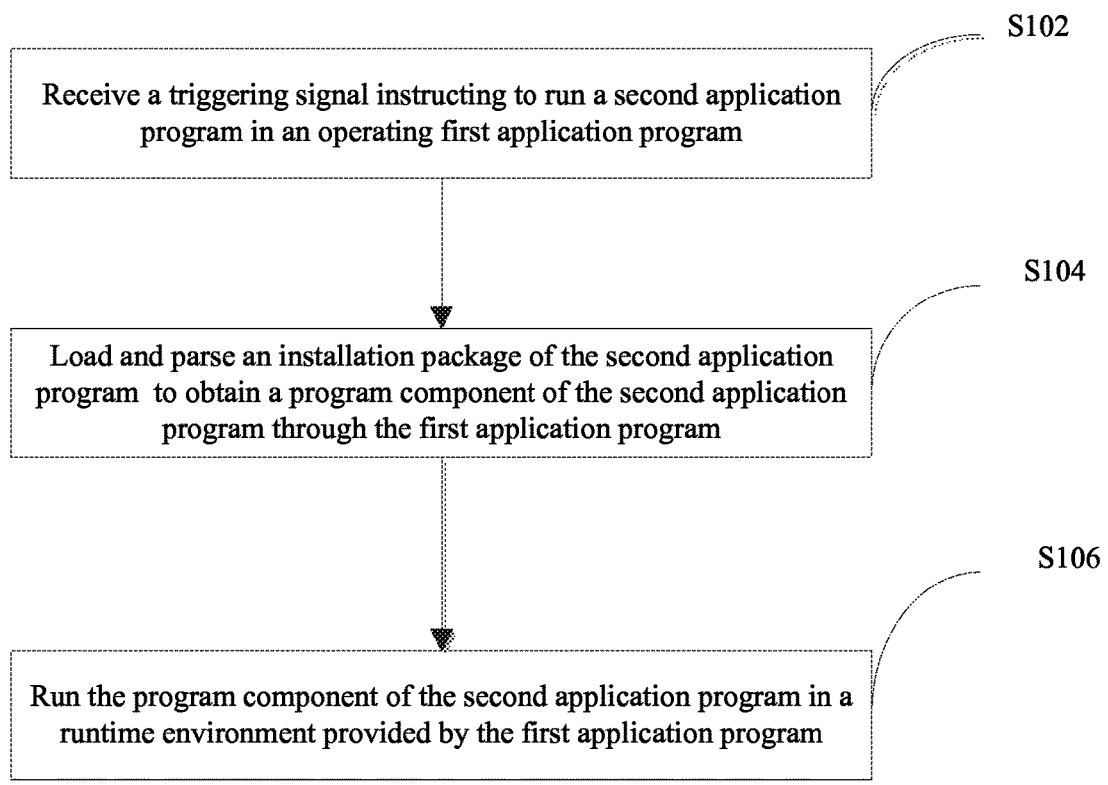
FIG. 1 is a flow chart showing a method for running an application program according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

First, terms involved in the present disclosure are introduced.

Android operating system is a Linux-based operating system with free and open source, which is produced by Google in USA and is mainly used in mobile devices. The mobile device may be a phone, a tablet PC, an electronic reader, a Moving Picture Experts Group Audio Layer III (MP3) Player, a Moving Picture Experts Group Audio Layer IV (MP4) Player, a laptop computer etc.

Installation package of an application program is a file configured to install the application program in an operating system and usually is a set of files which can be decompressed by themselves. The set includes all files necessary to run the application program. In the Android operating system, the installation package of the application program usually is a file packaged in an apk format.

Application program may be referred as application. In the Android operating system, one application program includes at least one program component. The program component is classified into four groups: an active component, a service component, a content provider component and a broadcast receiver component.

Active component is a component configured to interact with users in the Android application program and to provide a visual user interface for the Android application program. One Android application program can include zero to many active components.

Service component is a component running in background and not providing the visual user interface in the Android application program. One Android application program can include zero to many service components.

Content provider component is a component configured to provide data (such as a ringtone, a wallpaper, a phone book etc) for other applications or other components in the current application in the Android application program. The content provider component can pack data in various formats and provide the data in a standard format to other applications or components to use.

Broadcast receiver component is a component configured to receive and responds to a message broadcast by the operating system, which can receive an interested message (or a predetermined message of a certain type), and then process or transmit the message to other components in the current application.

An Intent (or "intent") is similar to a message configured to implement a communication between program components, in which the program components may be different components in a same application or different components in different applications. The Intent is configured to describe an action, data involved in the action and attached data in the application program in an operation. The Android operating system is configured to find the corresponding program component according to the Intent and to transmit the Intent to the called program component to complete a call of the program component. Therefore, an Intent provides a facility for performing late runtime binding between the code in different applications. Its most significant use is in the launching of activities, where it can be thought of as the glue between activities. It is basically a passive data structure holding an abstract description of an action to be performed. The Intent is classified into two groups: an explicit Intent and an implicit Intent.

Explicit Intent is an Intent that points out the name of a target program component definitely. For example, program component A needs to send an Intent "call 18688888888", if program component A hopes program component B to responds to the Intent, program component A specifies program component B as the target program component in the Intent. After receiving the Intent, the Android operating system hands over the Intent to program component B to process.

Implicit Intent is an Intent that does not explicitly point out the name of the target program component. For example, program component A needs to send the Intent "call 18688888888", if program component A does not know which program component shall respond to the Intent, program component A may not specifies the target program component in the Intent. After receiving the Intent, the Android operating system looks over a pre-registered the types of Intents monitored by each program component. If it is found that program component B monitors an Intent about a telephone call, the Android operating system hands over the Intent to program component B to process. Or, the Android operating system can broadcast the Intent and let the broadcast receiver component that is interested in the Intent related to the telephone call receives and processes the Intent.

FIG. 1 is the flow chart showing a method for running an application program according to an exemplary embodiment, and the exemplary embodiment is described by an example of applying the method for running the application program into a mobile terminal. The method for running the application program includes following steps.

In step S102, a triggering signal instructing to run a second application program is received in an operating first application program.

In step S104, an installation package of the second application program is loaded and parsed to obtain a program component of the second application program through the first application program.

In step S106, the program component of the second application program is run in a runtime environment provided by the first application program.

In conclusion, with the method for running the application program according to the exemplary embodiment, by loading and parsing the installation package of the second application program through the operating first application program, the program component of the second application program is obtained, and the program component of the second application program is running in the runtime environment provided by the first application program. Thus, the problem that only when a corresponding installation package is installed, an application program can be used is solved. Accordingly, the second application program can be run in the runtime environment provided by the first application program without installing the second application program.

Figure 2:
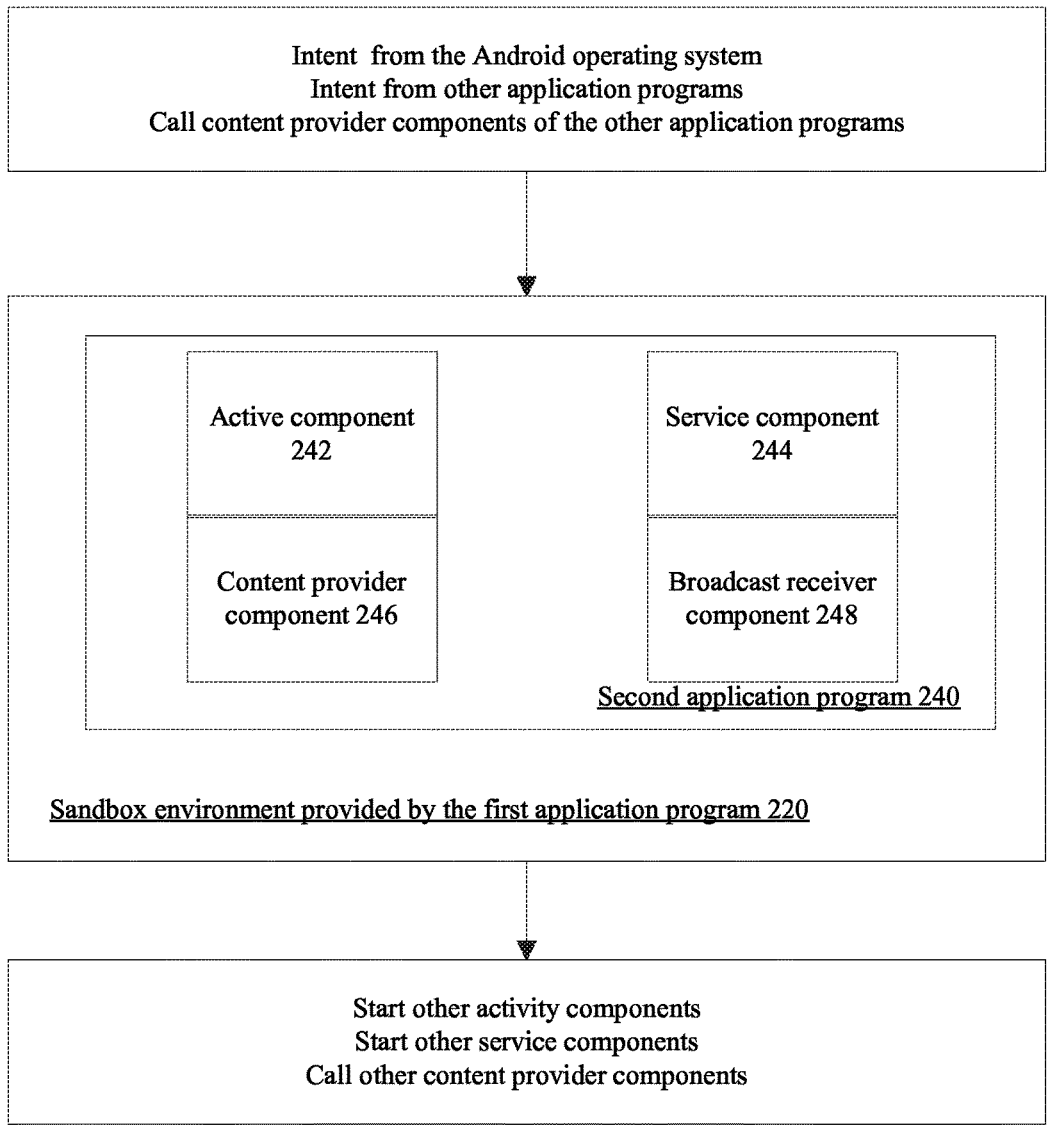
FIG. 2 is a schematic diagram illustrating a method for running an application program according to another exemplary embodiment.

For a better understanding, please refer to FIG. 2 which shows a schematic diagram illustrating a method for running an application program according to an exemplary embodiment. A first application program 220 is running in a mobile terminal and is configured to load and parse an installation package of a second application program 240 to obtain a program component of the second application program 240. The second application program 240 includes one or more program components, and each program component may be any one of an active component 242, a service component 244, a content provider component 246 and a broadcast receiver component 248. Then, the first application program 220 provides a sandbox environment for the second application program 240. The sandbox environment provides a context environment necessary for running the program component of the second application program 240 and the second application program 240 may be run by the sandbox environment.

In a process of running the second application program 240, the first application program 220 may run the program component in the second application program 240 according to a running logic of the second application program 240. For example, when the second application program 240 is started, the first application program 220 runs a default run component of the second application program 240, in which the default running component usually is an active component corresponding to a main interface of the second application program 240. Moreover, for example, if a certain button in a user interactive interface of the second application program 240 is compressed, the first application program 220 runs another active component of the second application program 240 so as to display a next user interactive interface of the second application program 240.

In addition, the Android operating system or other application programs (not shown) may send an Intent monitored by the second application program 240 to the first application program 220. After receiving the Intent, the first application program 220 runs a corresponding program component in the second application program 240 and transmits the Intent to the corresponding program component. The Android operating system or the other application programs also may call the content provider component 246 in the second application program 240 through the first application program 220, i.e., the Android operating system or the other application programs may use the data provided by the content provider component 246 in the second application program 240.

The second application program 240 may send the Intent to the Android operating system or the other application programs through the first application program 220. After receiving the Intent, the first application program 220 transmits the Intent to the Android operating system, such that the Android operating system may process the Intent directly or transmit the Intent to other application programs to process. The second application program 240 also may call the content provider components in other application programs through the first application program 220, i.e., the second application program 240 also may use the data provided by the content provider components in the other application programs.

It should be added that the second application program 240 is not required to have a special relationship with the first application program 220, and a special protocol and interface are not required to be implemented between the second application program 240 and the first application program 220, as long as the second application program 240 is in conformity with standards of the application program in Android operating system and the installation package of the second application program 240 is in conformity with the standards of the installation package in Android operating system.

Figure 3:
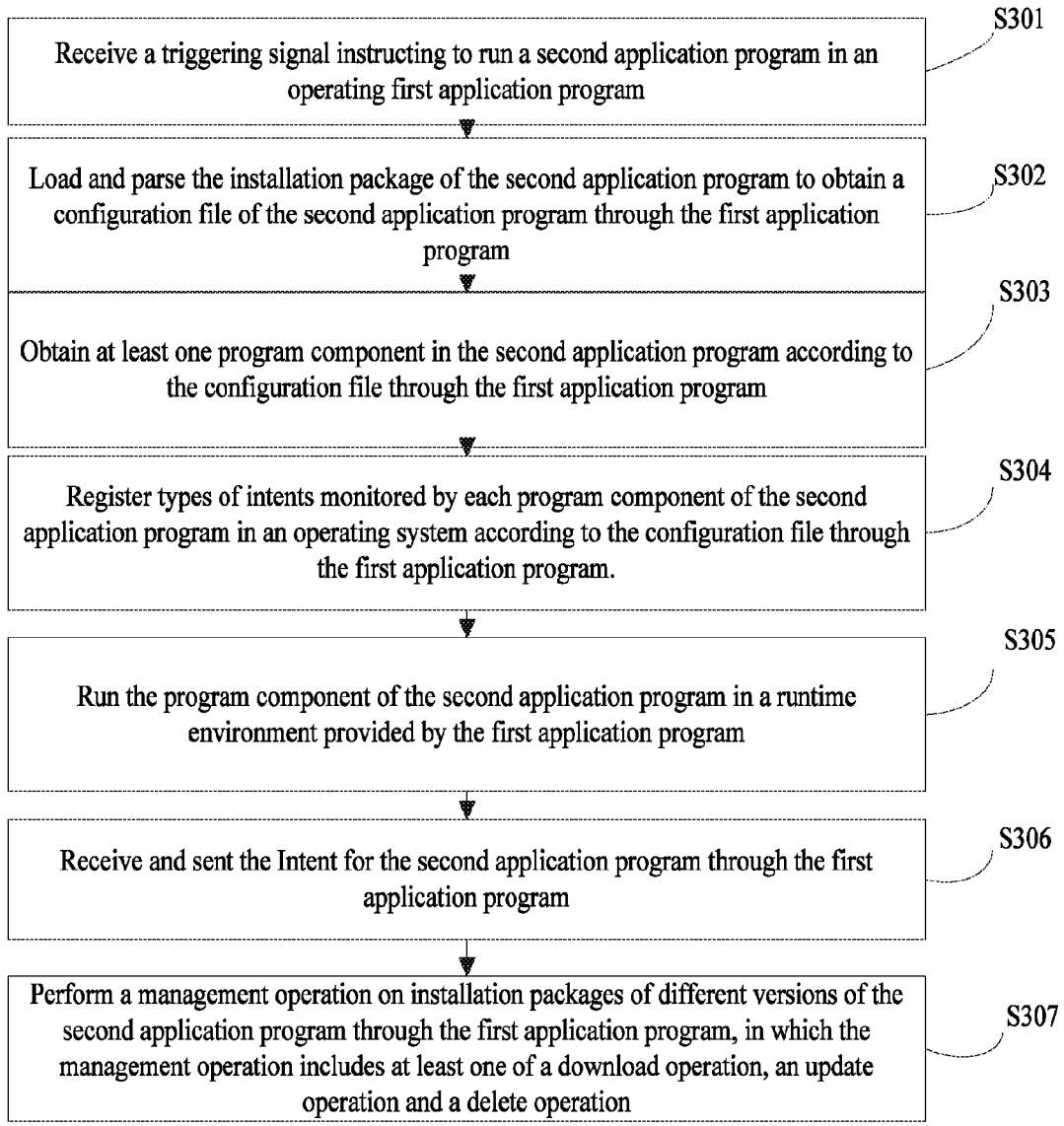
FIG. 3 is a flow chart showing a method for running an application program according to another exemplary embodiment.

FIG. 3 is the flow chart showing a method for running an application program according to another exemplary embodiment. The exemplary embodiment is described by an example of applying the method for running the application program in a mobile terminal, in which the mobile terminal may be a mobile terminal in which an Android operating system is running. The method for running the application program includes following steps.

In step S301, a triggering signal instructing to run a second application program is received in an operating first application program.

The first application program is an application program installed and is running in the mobile terminal. The first application program may be configured as a comprehensive application program, a game application program, a management application program, a system application program etc.

The first application program may access an installation package of the second application program in the mobile terminal. The second application program is not required to be installed in the mobile terminal, i.e., the second application program may be run in a runtime environment provided by the first application program.

The mobile terminal receives the triggering signal instructing to run the second application program in the operating first application program. The triggering signal may be a touch-screen clicking signal. For example, in a user interface of the first application program, an icon of the second application program may be displayed. If the icon of the second application program is clicked by a clicking signal received on the touch-screen, the mobile terminal receives the triggering signal instructing to run the second application program.

In step S302, an installation package of the second application program is loaded and parsed to obtain a configuration file of the second application program through the first application program.

The configuration file is a description file in the installation package of each second application program and usually is an AndroidManifest.xml file under a root directory of the installation package of the second application program. The configuration file may provide related application information in the second application program.

The mobile terminal loads the installation package of the second application program through the first application program, then parses the installation package of the second application program and obtains the configuration file of the second application program from the parsed files first.

In step S303, at least one program component in the second application program is obtained through the first application program according to the configuration file.

The configuration file declares all the program components included in the second application program. The program component includes at least an active component, a service component, a content provider component and a broadcast receiver component.

The mobile terminal parses the configuration file to obtain at least one program component of the second application program through the first application program.

In step S304, the types of Intents monitored by each program component of the second application program are registered in an operating system according to the configuration file through the first application program.

The configuration file may also declare the types of Intents monitored by each program component of the second application program. For example, active component A monitors an Intent of type A and service component B monitors an Intent of type B.

The mobile terminal registers the types of Intents monitored by each program component of the second application program in the operating system according to the configuration file through the first application program.

It should be noted that, when the first application program registers the type of the Intent monitored by the program component of the second application program, a receiver registered in the Android operating system is the program component of the first application program, instead of the program component of the second application program. For example, if active component A of the second application program monitors the Intent of type A, the first application program registers the Intent of type A in the Android operating system, but the receiver of the registered Intent of type A is the program component in the first application program.

In step S305, the program component of the second application program is running in a runtime environment provided by the first application program.

Figure 4:
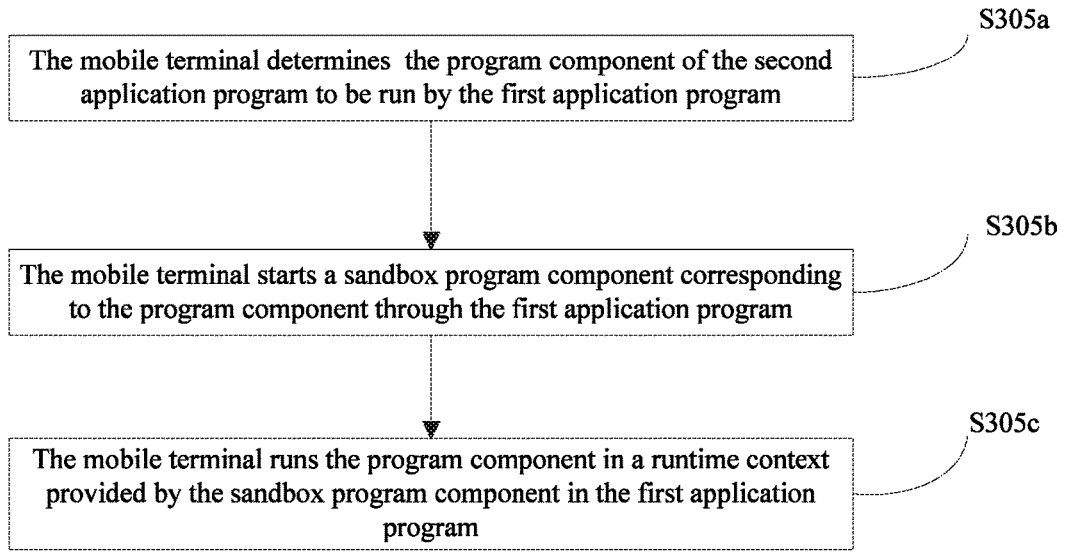
FIG. 4 is a flow chart showing substeps of a method for running an application program according to another exemplary embodiment.

The mobile terminal runs the program component of the second application program in the runtime environment provided by the first application program. Not all the program components of the second application program are needed to run at the same time, it is only needed to run a part of all the program components according to requirements. Step S305 includes following sub steps, as shown in FIG. 4.

In step S305a, the mobile terminal determines the program component of the second application program to be run by the first application program.

In step S305b, the mobile terminal starts a sandbox program component corresponding to the program component through the first application program.

In step S305c, the mobile terminal runs the program component in a runtime context provided by the sandbox program component in the first application program.

For step S305a, there mainly are following two situations.

First situation: at the start of the second application program, a default run component feedback is received by the second application program through the first application program and the default run component is determined as the program component to be run.

The default run component usually is an active component corresponding to the main interface of the second application program. When the second application program is started, the second application program feeds back a request to the first application program according to its own running logic, in which the request indicates the default run component, and then the first application program determines the default run component as the program component of the second application program to be run currently.

Second situation: the mobile terminal receives the Intent transmitted from the operating system by the first application program, in which the Intent is consistent with the registered type of the Intent. If the program component configured to monitor the Intent in the second application program is not started, the program component configured to monitor the Intent is determined as the program component to be run.

In a running process of the second application program, it is possible for the program component of the second application program, system application programs in the Android operating system and the program components in other application programs to send the Intent to the Android operating system. If the Intent is the Intent monitored by the program component of the second application program, i.e., the Intent is consistent with the registered type of the Intent at step S304, the Android operating system sends the Intent to the first application program. At this time, if the program component configured to monitor the Intent of the second application program is not started, the first application program determines the program component configured to monitor the Intent of the second application program as the program component to be run.

For step S305b, if it is needed to run any program component of the second application program, the mobile terminal starts a corresponding sandbox program component in the first application program first, in which the sandbox program component is configured to provide the runtime context environment necessary for the program component of the second application program.

For example, if it is needed to run active component A of the second application program, sandbox active component A in the first application program is started. Moreover, for example, if it is needed to run service component B of the second application program, sandbox service component B in the first application program is started. Furthermore, for example, if it is needed to run broadcast receiver component C of the second application program, sandbox broadcast receiver component C in the first application program is started.

In other words, when the program component of the second application program is running, there is a corresponding sandbox program component in the first application program.

Step S305c includes following substeps.

1. The mobile terminal calls the program component of the second application program through the sandbox program component in the first application program by using a reflection mechanism.

The reflection mechanism is a mechanism in Java programming field. By the reflection mechanism, a specified class of the program components of the second application program may be called without understanding the program component of the second application program through the first application program.

2. The mobile terminal runs the called program component in the runtime context provided by the sandbox program component in the first application program.

In step S306, the Intent is received and sent for the second application program through the first application program.

The mobile terminal receives and/or sends the Intent for the second application program through the first application program.

A receiving process: the mobile terminal receives the Intent transmitted from the Android operating system through the first application program, in which the Intent is consistent with registered type of the Intent, and transmits the Intent to the program component of the second application program to process, if the program component configured to monitor the Intent of the second application program is started.

For example, the first application program receives the Intent transmitted from the Android operating system. If the Intent is the Intent monitored by broadcast receiver component D of the second application program, the sandbox broadcast receiver component corresponding to broadcast receiver component D in the first application program calls an onReceive parameter of the broadcast receiver component D, such that broadcast receiver component D can process the Intent.

A sending process: the mobile terminal obtains an Intent to be sent by one program component of the second application program through the first application program and transmits the Intent to the Android operating system.

For example, if active component E of the second application program needs to send an Intent, active component E sends the Intent to a sandbox active component corresponding to active component E in the first application program first, and then the sandbox active component intercepts a SendBroadcast parameter of the Android operating system and transmits the Intent to the Android operating system by the SendBroadcast parameter.

The above process is a process in which the second application program is run in the first application program.

The second application program herein has a general reference and may refer to different application programs.

In step S307, a management operation is performed on installation packages of different versions of the second application program through the first application program, in which the management operation includes at least a download operation, an update operation and a delete operation.

The mobile terminal manages a plurality of the second application programs by the first application program. For each second application program, the mobile terminal manages the installation packages of different versions of the second application program through the first application program, in which the management operation includes at least the download operation, the update operation and the delete operation.

For example, the second application program has an installation package of a new version, and the installation package of the new version has more functions. The first application program may download the installation package of the new version and update the second application program to the latest version automatically, which does not involve a user, i.e., the user can obtain an update of the second application program unconsciously.

In conclusion, with the method for running the application program according to the exemplary embodiment, by loading and parsing the installation package of the second application program in the operating first application program, the program component of the second application program is obtained, and the program component of the second application program is run in the runtime environment provided by the first application program. Thus, the problem that only when a corresponding installation package is installed, an application program can be used is solved. Accordingly, the second application program can be run in the runtime environment provided by the first application program without installing the second application program.

With the method for running the application program according to the exemplary embodiment, by providing the runtime context of the corresponding program component of the second application program by the sandbox program component in the first application program, the second application program can be run in the runtime context provided by the first application program, as long as the second application program is consistent with the application standard of the Android operating system. No specified relationship is needed between the first application program and the second application program, and no specified protocol and interface are needed to be implemented between the first application program and the second application program.

With the method for running the application program according to the exemplary embodiment, by managing the installation packages of different versions of the second application program through the first application program, it is convenient to update the second application program dynamically, which does not involve the user, thus saving an operation and a study cost of the user.

In an actual exemplary embodiment, user A is an old person who needs to takes a large study cost to use a smart phone with an Android operating system or even cannot operate the smart phone. With a method for running an application program provided by above exemplary embodiments, an adding and deleting interface of the second application program can be provided by the first application program in the smart phone. It is only needed for user A to add or delete the second application program in the user interface of the first application program. If it is needed to use the second application program, the second application program may be opened in the first application program to be used directly without installing the second application program. Moreover, the first application program updates the installation package of the second application program to the latest version in background automatically. In the whole processing, it is only needed for use A to learn how to add, delete and open the second application program, which reduces the study cost of user A and avoids complex operations such as installing the second application program and updating the second application program, thus simplifying the user's operation greatly and improving a service efficiency of the second application program.

An apparatus embodiment of the present disclosure is shown as following and may be used to execute the method embodiment of the present disclosure. Details undisclosed in the apparatus embodiment of the present disclosure may be referred to the method embodiment of the present disclosure.

Figure 5:
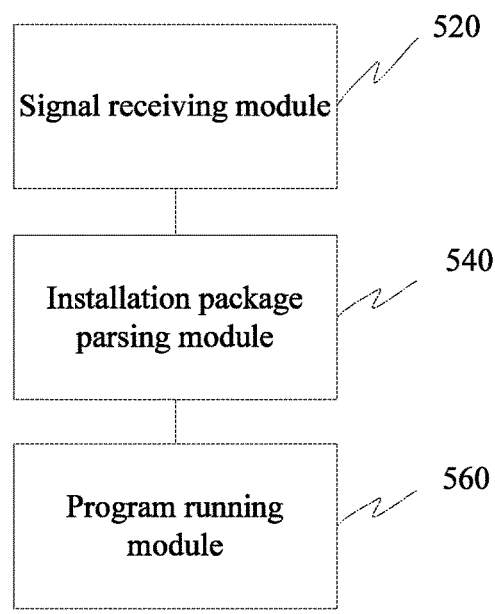
FIG. 5 is a block diagram illustrating an apparatus for running an application program according to an exemplary embodiment.

FIG. 5 is the block diagram illustrating an apparatus for running an application program according to an exemplary embodiment. The apparatus for running the application program may be configured as a whole mobile terminal or a part of the mobile terminal by software, hardware or a combination thereof, and the mobile terminal may be a mobile terminal in which an Android operating system is run. The apparatus for running the application program includes: a signal receiving module 520, an installation package parsing module 540 and an program running module 560.

The signal receiving module 520 is configured to receive a triggering signal instructing to run a second application program in an operating first application program.

The installation package parsing module 540 is configured to load and parse an installation package of the second application program to obtain a program component of the second application program through the first application program.

The program running module 560 is configured to run the program component of the second application program in a runtime environment provided by the first application program.

In conclusion, with the apparatus for running the application program according to the exemplary embodiment, by loading and parsing the installation package of the second application program in the operating first application program, the program component of the second application program is obtained, and the program component of the second application program is run in the runtime environment provided by the first application program. Thus, the problem that only when a corresponding installation package is installed, an application program can be used is solved. Accordingly, the second application program can be run in the runtime environment provided by the first application program without installing the second application program.

Figure 6:
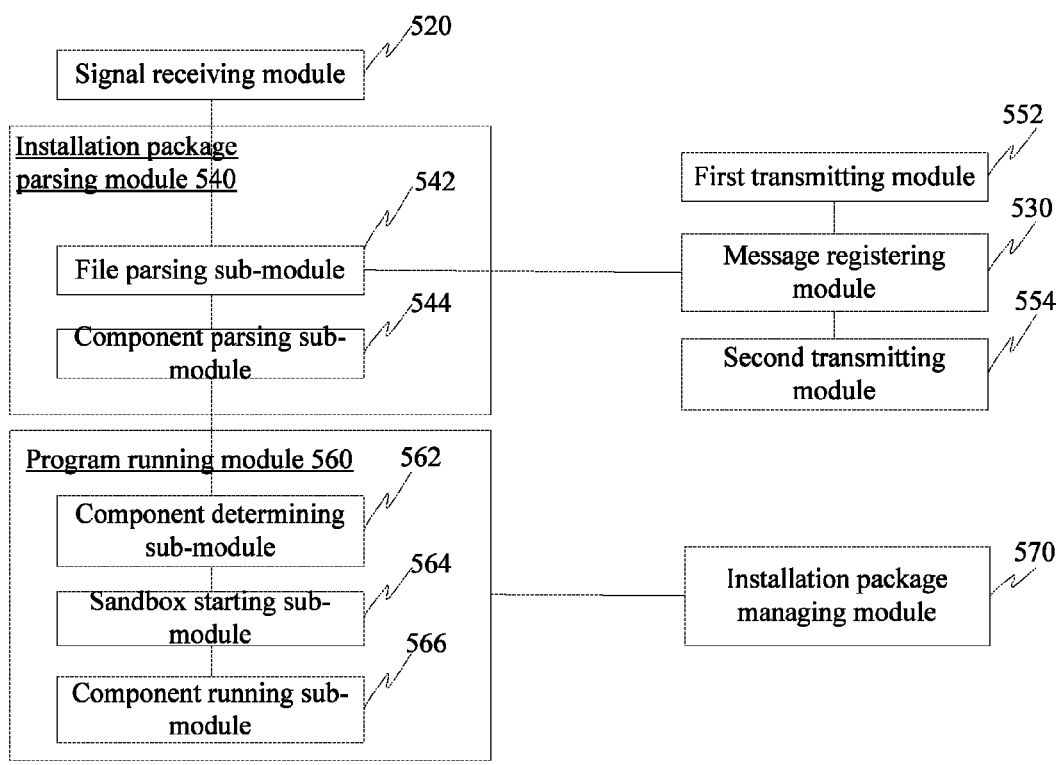
FIG. 6 is a block diagram illustrating an apparatus for running an application program according to another exemplary embodiment.

FIG. 6 is the block diagram illustrating an apparatus for running an application program according to another exemplary embodiment. The apparatus for running the application program may be configured as a whole mobile terminal or a part of the mobile terminal by software, hardware or a combination thereof, and the mobile terminal may be a mobile terminal in which an Android operating system is run. The apparatus for running the application program includes: a signal receiving module 520, an installation package parsing module 540 and an program running module 560.

The signal receiving module 520 is configured to receive a triggering signal instructing to run a second application program in an operating first application program.

The installation package parsing module 562 is configured to load and parse an installation package of the second application program to obtain a program component of the second application program through the first application program.

The program running module 560 is configured to run the program component of the second application program in a runtime environment provided by the first application program.

Alternatively, the program running module 560 includes: a component determining sub-module 562, a sandbox starting sub-module 564 and a component running sub-module 566.

The component determining sub-module 562 is configured to determine the program component of the second application program to be run by the first application program.

The sandbox starting sub-module 564 is configured to start a sandbox program component corresponding to the program component through the first application program.

The component running sub-module 566 is configured to run the program component in a runtime context provided by the sandbox program component in the first application program.

Alternatively, the component running sub-module 562 includes: a calling sub-module and a running sub-module.

The calling sub-module is configured to call the program component through the sandbox program component in the first application program by using a reflection mechanism.

The running sub-module, configured to run the called program component in the runtime context provided by the sandbox program component in the first application program.

Alternatively, the installation package parsing module 540 includes: a file parsing sub-module 542 and a component parsing sub-module 544.

The file parsing sub-module 542 is configured to load and parse the installation package of the second application program to obtain a configuration file of the second application program through the first application program.

The component parsing sub-module 544 is configured to obtain at least one program component in the second application program according to the configuration file through the first application program, in which the program component includes at least an active component, a service component, a content provider component and a broadcast receiver component.

Alternatively, the apparatus further includes a message registering module 530, configured to register types of Intents monitored by each program component of the second application program in an operating system according to the configuration file through the first application program.

Alternatively, the component determining sub-module 562 includes: a first determining sub-module, a message receiving sub-module and a second determining sub-module.

The first determining sub-module is configured to receive a default run component feedback by the second application program through the first application program and determine the default run component as the program component to be run, during starting the second application program.

The message receiving sub-module is configured to receive an Intent transmitted from the operating system through the first application program, in which the Intent is consistent with types of the registered Intents;

The second determining sub-module is configured to determine the program component configured to monitor the Intent as the program component to be run, when in the second application program, the program component configured to monitor the Intent is not started.

Alternatively, the apparatus further includes: a first transmitting module 552, configured to receive an Intent transmitted from the operating system through the first application program, in which the Intent is consistent with types of the registered Intents, and to transmit the Intent to the program component to process, when in the second application program, the program component configured to monitor the Intent is started; and/or a second transmitting module 554, configured to obtain an Intent to be sent by one program component of the second program application through the first application program and transmit the Intent to the operating system.

Alternatively, the apparatus further includes: an installation package managing module 570, configured to perform a management operation on installation packages of different versions of the second application program through the first application program, in which the management operation includes at least a download operation, an update operation and a delete operation.

In conclusion, with the apparatus for running the application program according to the exemplary embodiment, by loading and parsing the installation package of the second application program in the operating first application program, the program component of the second application program is obtained, and the program component of the second application program is run in the runtime environment provided by the first application program. Thus, the problem that only when a corresponding installation package is installed, an application program can be used is solved. Accordingly, the second application program can be run in the runtime environment provided by the first application program without installing the second application program.

With the apparatus for running the application program according to the exemplary embodiment, by providing the runtime context of the corresponding program component of the second application program by the sandbox program component in the first application program, the second application program can be run in the runtime context provided by the first application program, as long as the second application program is consistent with the application standard of the Android operating system. No specified relationship is needed between the first application program and the second application program, and no specified protocol and interface are needed to be implemented between the first application program and the second application program.

With the apparatus for running the application program according to the exemplary embodiment, by managing the installation packages of different versions of the second application program through the first application program, it is convenient to update the second application program dynamically, which does not involve the user, thus saving an operation and a study cost of the user.

With respect to the apparatus in the above exemplary embodiments, the specific manners for performing operations for individual modules therein have been described in detail in the exemplary embodiments regarding the methods for running the application program, which will not be elaborated herein.

Figure 7:
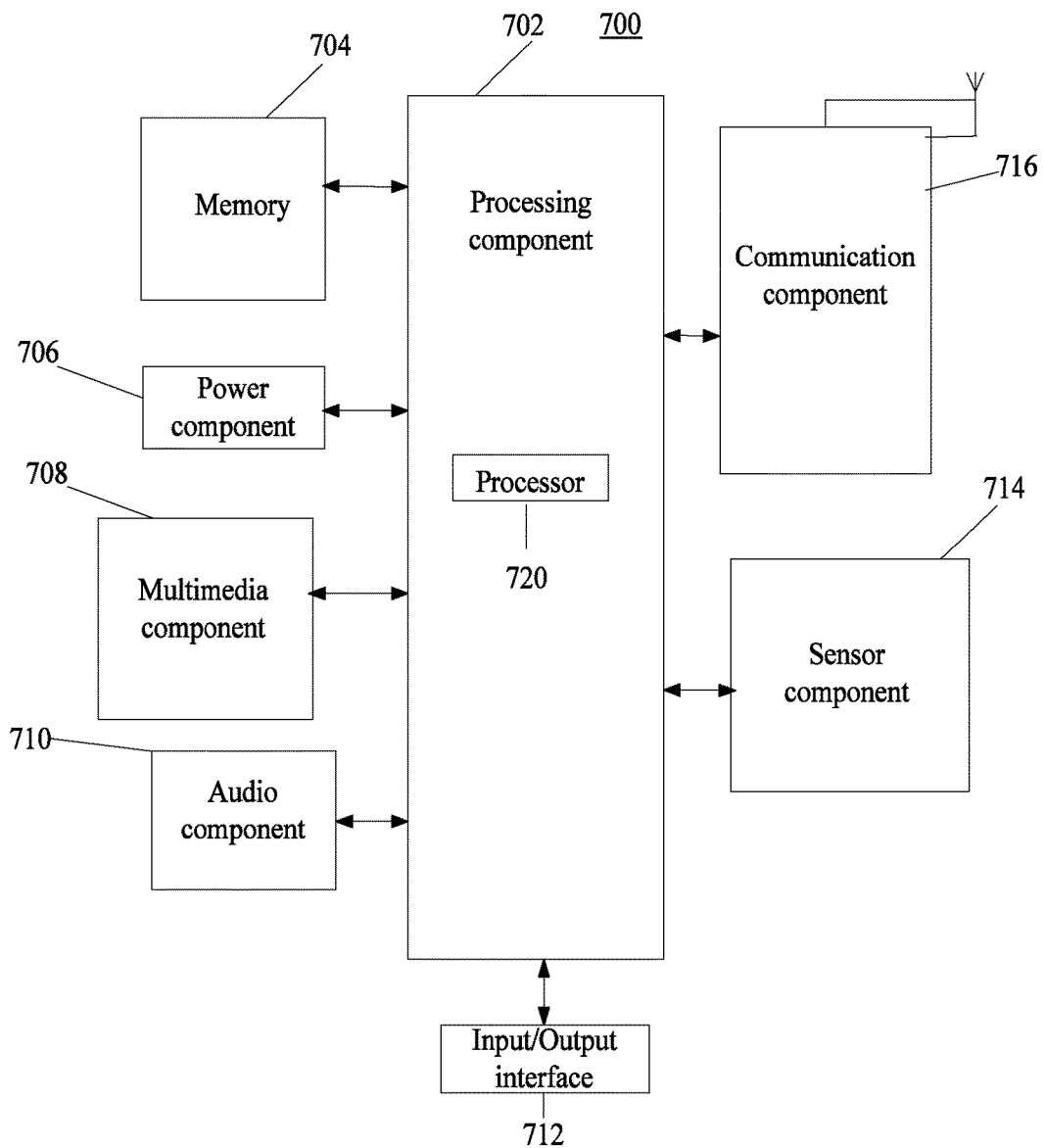
FIG. 7 is a block diagram illustrating a device according to an exemplary embodiment.

FIG. 7 is the block diagram illustrating a device 700 for running an application program according to an exemplary embodiment. For example, the device 700 may be a mobile phone, a television, a computer, a digital broadcast terminal, a messaging device, a gaming console, a tablet, a medical device, exercise equipment, a personal digital assistant, and the like.

Referring to FIG. 7, the device 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the device 700 such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 may include a power management system, one or more power sources, and any other components associated with the generation, management, and distribution of power in the device 700.

The multimedia component 708 includes a screen providing an output interface between the device 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive an external multimedia datum while the device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone (MIC) configured to receive an external audio signal when the device 700 is in an operation mode, such as a calling mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the device 700. For instance, the sensor component 714 may detect an open/closed status of the device 700, relative positioning of components, e.g., the display and the keypad, of the device 700, a change in position of the device 700 or a component of the device 700, a presence or absence of user contact with the device 700, an orientation or an acceleration/deceleration of the device 700, and a change in temperature of the device 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the device 700 and other devices. The device 700 may access a wireless network based on a communication standard, such as WiFi, 2Q or 3Q or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as the memory 704 including instructions which is executable by the processor 720 of the device 700 for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium is provided, in which when the instructions in the storage medium are executed by a processor of a device 700, the device 700 may execute a method for running an application program provided by an embodiment in FIG. 1 or 3.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for running an application program in a mobile terminal, comprising:
   receiving a triggering signal instructing to run a second application program in an operating first application program;
   loading and parsing an installation package of the second application program to obtain a program component of the second application program through the first application program; and
   running the program component of the second application program in a runtime environment provided by the first application program without installing the second application program.

2. The method according to claim 1, wherein running the program component of the second application program in the runtime environment provided by the first application program comprises:
   determining the program component of the second application program to be run by the first application program;
   starting a sandbox program component corresponding to the program component through the first application program; and
   running the program component in a runtime context provided by the sandbox program component in the first application program.

3. The method according to claim 2, wherein running the program component in the runtime context provided by the sandbox program component in the first application program comprises:
   calling the program component through the sandbox program component in the first application program using a reflection mechanism; and
   running the called program component in the runtime context provided by the sandbox program component in the first application program.

4. The method according to claim 2, wherein loading and parsing the installation package of the second application program to obtain the program component of the second application program through the first application program comprises:
   loading and parsing the installation package of the second application program to obtain a configuration file of the second application program through the first application program; and
   obtaining at least one program component in the second application program according to the configuration file through the first application program, wherein the program component comprises at least an active component, a service component, a content provider component and a broadcast receiver component.

5. The method according to claim 4, further comprising:
   registering types of intents monitored by each program component of the second application program in an operating system according to the configuration file through the first application program.

6. The method according to claim 2, wherein determining the program component of the second application program to be run by the first application program comprises:
   at the start of the second application program, receiving a default run component feedback by the second application program through the first application program; and
   determining the default run component as the program component to be run.

7. The method according to claim 5, wherein determining the program component of the second application program to be run by the first application program comprises:
   receiving an intent transmitted from the operating system through the first application program, wherein the intent is consistent with the types of intents registered in the operating system; and
   determining the program component configured to monitor the intent as the program component to be run, when, in the second application program, the program component configured to monitor the intent has not been started.

8. The method according to claim 5, further comprising:
   receiving an intent transmitted from the operating system through the first application program, wherein the intent is consistent with the types of intents registered in the operating system;
   transmitting the intent to the program component to process, when, in the second application program, the program component configured to monitor the intent is started;
   obtaining an intent to be sent by one program component in the second application program; and
   transmitting the intent to the operating system.

9. The method according to claim 5, further comprising:
   obtaining an intent to be sent by one program component in the second application program; and
   transmitting the intent to the operating system.

10. The method according to claim 1, further comprising:
    performing a management operation on installation packages of different versions of the second application program through the first application program, wherein the management operation comprises at least a download operation, an update operation and a delete operation.

11. A device for running an application program in a mobile terminal, comprising:
    a processor;
    a memory configured to store an instruction executable by the processor;
    wherein the processor is configured to perform:
    receiving a triggering signal instructing to run a second application program in an operating first application program;

loading and parsing an installation package of the second application program to obtain a program component of the second application program through the first application program; and running the program component of the second application program in a runtime environment provided by the first application program without installing the second application program.

12. The device according to claim 11, wherein running the program component of the second application program in the runtime environment provided by the first application program comprises:

determining the program component of the second application program to be run by the first application program;

starting a sandbox program component corresponding to the program component through the first application program; and running the program component in a runtime context provided by the sandbox program component in the first application program.

13. The device according to claim 12, wherein running the program component in the runtime context provided by the sandbox program component in the first application program comprises:

calling the program component through the sandbox program component in the first application program using a reflection mechanism; and running the called program component in the runtime context provided by the sandbox program component in the first application program.

14. The device according to claim 12, wherein loading and parsing the installation package of the second application program to obtain the program component of the second application program through the first application program comprises:

loading and parsing the installation package of the second application program to obtain a configuration file of the second application program through the first application program; and obtaining at least one program component in the second application program according to the configuration file through the first application program, wherein the program component comprises at least an active component, a service component, a content provider component and a broadcast receiver component.

15. The device according to claim 14, wherein the processor is further configured to perform:

registering types of intents monitored by each program component of the second application program in an operating system according to the configuration file through the first application program.

16. The device according to claim 12, wherein determining the program component of the second application program to be run by the first application program comprises:

at the start of the second application program, receiving a default run component feedback by the second application program through the first application program; and determining the default run component as the program component to be run.

17. The device according to claim 15, wherein determining the program component of the second application program to be run by the first application program comprises:

receiving an intent transmitted from the operating system through the first application program, wherein the intent is consistent with the types of intents registered in the operating system; and determining the program component configured to monitor the intent as the program component to be run, when, in the second application program, the program component configured to monitor the intent has not been started.

18. The device according to claim 15, wherein the processor is further configured to perform:

receiving an intent transmitted from the operating system through the first application program, wherein the intent is consistent with the types of intents registered in the operating system;

transmitting the intent to the program component to process, when, in the second application program, the program component configured to monitor the intent is started;

obtaining an intent to be sent by one program component in the second application program; and transmitting the intent to the operating system.

19. The device according to claim 15, wherein the processor is further configured to perform:

obtaining an intent to be sent by one program component in the second application program; and transmitting the intent to the operating system.

20. The device according to claim 1, wherein the processor is further configured to perform:

performing a management operation on installation packages of different versions of the second application program through the first application program, wherein the management operation comprises at least a download operation, an update operation and a delete operation.

21. A non-transitory computer-readable storage medium having stored therein instructions that, when executed by a processor of a mobile terminal, causes the mobile terminal to perform a method for running an application program, the method comprising:

receiving a triggering signal instructing to run a second application program in an operating first application program;

loading and parsing an installation package of the second application program to obtain a program component of the second application program through the first application program; and running the program component of the second application program in a runtime environment provided by the first application program without installing the second application program in the mobile terminal.

* * * * *